Sept. 24, 1940.         J. C. EHRLICH         2,215,466
                        INDEXING DEVICE
                      Filed May 26, 1938
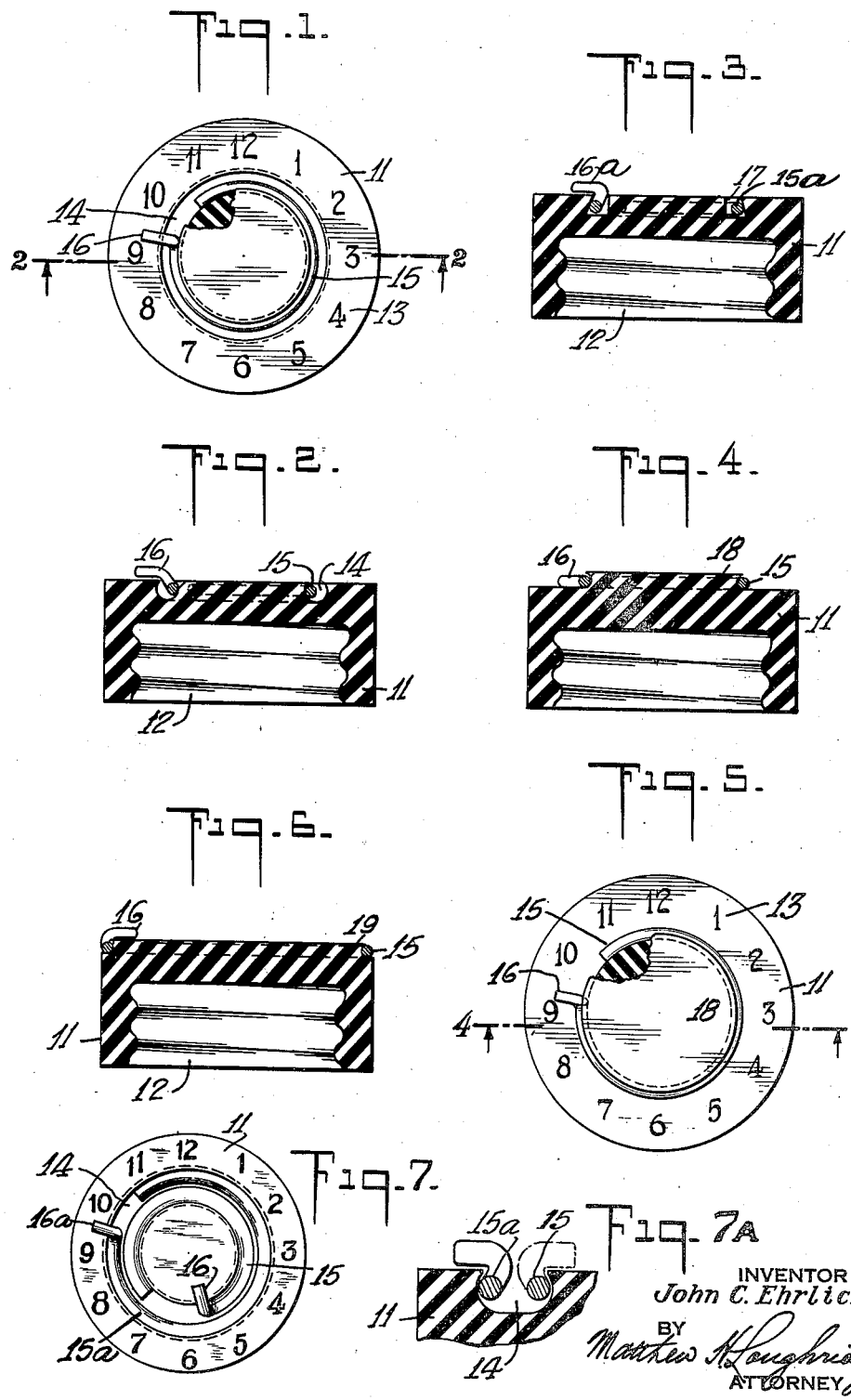

Patented Sept. 24, 1940

2,215,466

UNITED STATES PATENT OFFICE 2,215,466

INDEXING DEVICE

John C. Ehrlich, Brooklyn, N. Y.

Application May 26, 1938, Serial No. 210,108

5 Claims. (Cl. 116—121)

This invention relates to indexing devices, such as are used to point out an index mark by a movable member and it may be constructed as a device solely for indexing purposes, or it may be built into other apparatus where an index is desirable, as, for instance, to point out time or to register any particular mark or number for future reference. An object of the invention is to provide an indexing device that is low in cost and that cannot readily get out of order; another object of the invention is to provide an indexing device that may be applied in a groove on the indexed surface and another object of the invention is to provide an indexing device that can be easily set by the fingernail or the point of a pencil and that is retained in the set position.

Another object of the invention is to provide an indexing member for a bottle cap located in an undercut groove in the cap and another object of the invention is to provide an indexing member in a molded, plastic body, having an undercut groove therein and in which a wire ring is located therein for indexing purposes. Other objects of the invention will be more particularly understood from the variety of applications thereof, illustrated in the accompanying drawing and described in the following specification.

In the drawing:

Fig. 1 is a top plan view of one form of my invention applied to a bottle cap using a spring wire indexing member;

Fig. 2 is a sectional elevation on line 2—2 of Fig. 1;

Fig. 3 is a modified sectional elevation of the type of cap shown in Fig. 1;

Fig. 4 is a sectional elevation on line 4—4 of Fig. 5;

Fig. 5 is a top plan view of another form of a bottle cap using a wire indexing member;

Fig. 6 is a sectional elevation of another modification of a bottle cap having a wire indexing member;

Fig. 7 is a top plan view of a bottle cap or similar device having a pair of indexing members, and Fig. 7a is a sectional detail of the construction shown in Fig. 7.

One particular use of this invention is in connection with caps for medicine bottles in which the dose is to be taken at periodic intervals. The top of the cap is provided with numerals corresponding to the face of a watch and an undercut groove is provided in the body of the cap and centered on the cap and in this groove an indexing member is located which may readily be moved by the finger to any position corresponding to the time at which the next dose is to be taken. One way of securing this result is to locate a spring ring in the undercut groove with an indexing mark on the ring so that it may be rotated in the groove to bring the mark opposite the time to be indicated. This provides an inexpensive construction that adds little to the cost of the regular molded bottle cap.

In Fig. 1, 11 is the bottle cap which may be provided with the usual screw socket to secure on the neck of the bottle and the top is provided with a row of time indexing characters 13 and with an undercut groove 14 centered on the cap. In this groove the wire ring 15 is located, having one end projecting at 16 to indicate the numeral desired and by which the ring is readily rotated in the groove. In the construction in Fig. 3 the groove is shown as having a "square" section and undercut as indicated at 17 and the wire ring 15a is shown as engaging the outer side of the groove and as provided with the index finger 16a to register with the marks.

The construction in Fig. 4 indicates a raised collar at 18 on the top of the cap which has an undercut groove in the side thereof to receive the index ring 15. In the construction in Fig. 6 the undercut groove for the wire ring is provided at the top edge of the cap as indicated at 19 and the indexing finger 16 is turned inwards.

In Figs. 7 and 7a the groove 14 is made of sufficient width to receive the ring 15 and the ring 15a which may be freely rotated in this groove independently of each other, the index finger 16a of ring 15a projects outwardly over the marked portion of the body and the index finger 16 points inwardly to avoid the finger 16a and which can be located opposite any of the marks shown. By this arrangement one index finger may be used to indicate time, AM and the other index finger may be used to indicate time, PM, and if desired a different color may be used in each case. The index fingers may also be used, one to point out the hour and the other to point out divisions of the hour on the same dial.

The undercut groove 14 can be made by drawing the mold before the plastic material cools, which is now practiced in certain cases with reference to drawing the mold from the threaded socket at 12. The indexing ring is preferably made of spring wire, but may be made of any material that has sufficient resiliency and that will move freely in the groove. The spring ring should be made smaller than the groove so that it will engage the inside of the groove, or it may be made larger than the groove so that it will engage the outside of the groove and have a normal bias to hold it in the position to which it has been adjusted.

The groove in the ledge 18 is undercut to hold the spring ring in place and is the equivalent of the groove 14 which is cut into the surface of the device.

Having thus described my invention, I claim:

1. An indexing device comprising a member with an undercut groove therein having a bottom and a side wall and having index marks placed around the groove, and a spring ring of wire smaller in diameter than the depth of said groove, located in said groove and having a portion arranged to register with the index marks, said ring having a bias to frictionally engage the side wall of said groove.

2. An indexing device comprising a member with an annular, undercut groove therein having a bottom and a side wall and having index marks placed around the groove, and a wire spring located in said groove and frictionally engaging the side wall of the groove and having a projection arranged to register with the index marks.

3. An indexing device comprising a member with an annular, undercut groove therein having a bottom and a side wall and having index marks placed around the groove, and a wire spring ring located in said groove and having a bias to expand and engage the side wall by friction and a projection on said ring arranged to register with the index marks.

4. An indexing device comprising a member with an annular, undercut groove therein and having index marks placed around the groove, a wire spring ring located in said groove having a bias to contract in said groove and a second wire spring ring located in said groove and having a bias to expand in said groove, said rings being freely movable in said groove independently of each other and a portion of each ring being arranged to register with said index marks.

5. An indexing device comprising a member with a groove therein having a bottom and a side wall and having index marks placed adjacent the groove and an open wire spring in said groove frictionally engaging the side wall of the groove and having an end portion of the wire bent to register with the index marks.

JOHN C. EHRLICH.